United States Patent
Garud et al.

(10) Patent No.: US 9,208,545 B2
(45) Date of Patent: Dec. 8, 2015

(54) ADAPTIVE WEIGHTED-LOCAL-DIFFERENCE ORDER STATISTICS FILTERS

(71) Applicant: Texas Instruments Incorporated, Dallas, TX (US)

(72) Inventors: Hrushikesh Tukaram Garud, Maharashtra (IN); Debdoot Sheet, West Bengal (IN); Ajoy Kumar Ray, West Bengal (IN); Manjunatha Mahadevappa, West Bengal (IN); Jyotirmoy Chatterjee, West Bengal (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 76 days.

(21) Appl. No.: 14/032,314

(22) Filed: Sep. 20, 2013

(65) Prior Publication Data

US 2015/0086125 A1    Mar. 26, 2015

(51) Int. Cl.
| | |
|---|---|
| *G06K 9/40* | (2006.01) |
| *G06T 5/20* | (2006.01) |
| *G06T 5/00* | (2006.01) |

(52) U.S. Cl.
CPC . *G06T 5/20* (2013.01); *G06T 5/002* (2013.01); *G06T 2207/20012* (2013.01); *G06T 2207/20032* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 2009/0041373 A1* | 2/2009 | Incesu et al. | 382/264 |
| 2009/0074318 A1* | 3/2009 | Yoo et al. | 382/260 |
| 2011/0142136 A1* | 6/2011 | Liu et al. | 375/240.18 |

* cited by examiner

*Primary Examiner* — Sean Motsinger
(74) *Attorney, Agent, or Firm* — Robert D. Marshall, Jr.; Frank D. Cimino

(57) ABSTRACT

A novel modification to the order statistics filters called the Adaptive Weighted-Local-Difference Order Statistics is shown that will act as a generic framework for the design of adaptive filters suitable for specific signal processing applications. To demonstrate the design of filters using this framework two implementations were defined and evaluated: Edge Orientation Adaptive Weighted-Local-Difference Median Filter (EOAWLDMF) and Luminance-Similarity Adaptive Weighted-Local-Difference Median Filter (LSAWLDMF) for restoration of noisy images.

5 Claims, 2 Drawing Sheets

ADAPTIVE WEIGHTED-LOCAL-DIFFERENCE ORDER STATISTICS FILTERS

BACKGROUND OF THE INVENTION

Order Statistics Filters are widely used in signal processing and restoration arena. Their favorable ability to preserve signal details and the computational simplicity also adds to their popularity.

The best known and most widely used filter based on order statistics is the Median Filter (MF). To improve the noise suppression and signal preserving capability several modifications of the order statistics filters such as weighted order statistics filters, adaptive order statistics filters, adaptive weighted order statistics filters, decision based order statistics filters, fuzzy weighted order statistics filters, FIR-order statistics hybrid filters and Neural Network-order statistics hybrid filters have been proposed. This list is in no way exhaustive and several more modifications and their variations are present.

SUMMARY OF THE INVENTION

A novel modification to the order statistics filters is described that will act as a general framework for the design of adaptive filters in image and signal processing applications. Defining the weighting factor used in this framework as a function of direct/indirect functions of the input signal and the properties of the signal makes the filter adaptive, and can achieve a fine balance between noise filtering and signal preservation.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
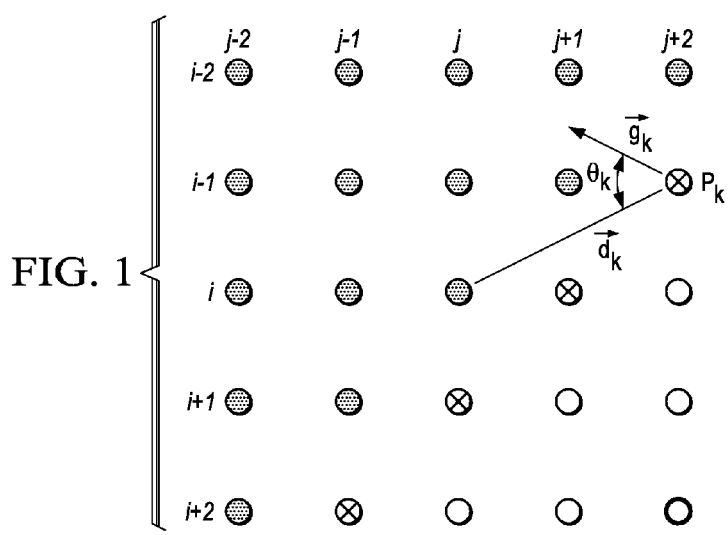
FIG. 1 shows the relation of the central pixel at locations (i,j) with its neighboring pixels $\{p_n\}$.

For a set of N random observations $\{p1, p2, \ldots, pN\}$ arranged in ascending order of magnitude, $$p_{(1)} \le p_{(2)} \le \ldots \le p_{(N)} \quad (1)$$

p(k) is called the $k^{th}$ order statistic. The median over the set $\{pk\}$ is denoted as med $\{pk\}$ and it is given by:

$$med\{p_k\} = \begin{cases} p_{(v+1)} & \text{if } N = 2v+1 \\ \frac{1}{2}(p(v) + p(v+1)) & \text{if } N = 2v \end{cases} \quad (2)$$

Consider an operational neighborhood W centered at a location (i, j) on a gray-scale image F, and the <<-level values at the pixel locations within W are represented as $\{p1, p2, \ldots, pN\}$ where N is the total number of pixels within W.

The minimum and maximum gray level values in the set of $\{pk\}$ are p(1) and p(N). In terms of gray-level mathematical morphology these values represent the output f erosion and dilation operations respectively denoted as $F^{\ominus}(i, j)$, and $F^{\oplus}(i, j)$ they are represented respectively as:

$$F_{\ominus}(i, j) = \min_{p_k \in W} \{p_k\} \quad (3)$$

$$F_{\oplus}(i, j) = \max_{p_k \in W} \{p_k\} \quad (4)$$

while the MF operator $F^{\odot}(i, j)$ is given by $$F_{\odot}(i, j) = \underset{p_k \in W}{med} \{p_k\} \quad (5)$$

Before introducing the modification of the order statistics filters we rewrite the filter formulations presented in equations (3), (4) and (5) as:

$$F_{\ominus}(i, j) = F(i, j) + \underset{p_k \in W}{med} \{(p_k - F(i, j))\} \quad (6)$$

$$F_{\oplus}(i, j) = F(i, j) + \underset{p_k \in W}{med} \{(p_k - F(i, j))\} \quad (7)$$

$$F_{\odot}(i, j) = F(i, j) + \underset{p_k \in W}{med} \{(p_k - F(i, j))\} \quad (8)$$

Here the filter outputs are defined in terms of sum of the central pixel gray value and corresponding order statistics over gray level differences of the neighborhood pixels with the central pixel.

Here we introduce a weighting function w(•) in the equations 6, 7 and 8 to modify them as $$F_{\ominus}(i, j) = F(i, j) + \underset{p_k \in W}{med} \{w_k(p_k - F(i, j))\} \quad (9)$$

$$F_{\oplus}(i, j) = F(i, j) + \underset{p_k \in W}{med} \{w_k(p_k - F(i, j))\} \quad (10)$$

$$F_{\odot}(i, j) = F(i, j) + \underset{p_k \in W}{med} \{w_k(p_k - F(i, j))\} \quad (11)$$

where $w_k$ represents the value of weighting function w(•) for $k^{th}$ element in the W.

This modification unlike many other modifications of the order statistics filters enables the modified filter to generate an output that may not be a value from input signal values. Use of weight values between the range [0, 1] limits the output within range [p(1), p(N)]. Here it should be noted that for the set of pixels in W for which $$\{w_k = 1 | \forall p_k \in W\}$$

equations (9), (10), (11) converge to the conventional definitions in equations (3), (4), (5). Further, defining W as a direct/indirect function of the signal, and spatial relationship of the pixels makes the filter adaptive and can help achieve fine balance between noise filtering and signal perseverance.

In order to demonstrate utility of the framework in design of custom filters to suit specific requirements of an application, we define two adaptive filters whose weighing functions are functions of the image features and geometric relationship amongst the neighboring pixels.

Conventional order statistics filters, although capable of preserving image details, are not conscious and are susceptible to adversely affect them. Since edges and gradients carry most of the visually important information in images we first define Edge Orientation Adaptive Weighted-Local-Difference Median Filter for noise removal while preserving edges and gradients.

For this filter w(•) is defined as a function of relative edge orientation at a neighborhood pixel and its geometrical proximity with the central pixel.

Consider an operational window in an image as illustrated in FIG. 1 for understanding the relation between the central pixel and its neighbors when deriving weighting function values. The gray-value of the $k^{th}$ pixel in the operational neighborhood is pk and $\vec{dk}$ is the physical distance vector connecting $k^{th}$ point with the central pixel at (i, j), while $\vec{gk}$ is the gradient vector at $k^{th}$ pixel location, and k represents the angle between $\vec{gk}$ and $\vec{dk}$. Then $w_k(•)$ is defined as $$w_k(•) = w_k^g(•) \times w_k^d(•) \quad (12)$$

where $w_k^g(•)$ and $w_k^d(•)$ are further functions of relative orientation of an edge at the neighborhood pixel and the spatial distance between the central pixel and neighborhood pixel respectively. The $w_k^g(•)$ is defined as:

$$w_k^g(•) = \sin|\theta_k| \quad (13)$$

Such definition of the $w_k^g(•)$ ensures that the weight $w_k(•)$ for the pixels across the edge from the central pixel becomes very small and effectively reduces blurring or shifting of the edges. Whereas $w_k^d(•)$ is defined as:

$$w_k^d(•) = \exp\left\{-\left(\frac{d_k}{\beta}\right)^2\right\} \quad (14)$$

where $dk=|\vec{dk}|$, β is a constant controlling the flatness of the $w_k^d(•)$. This definition is based on the assumption that the neighborhood pixels present in close proximity of the center pixel exhibits the highest degree of associativity which decreases with increase in distance.

Figure 2:
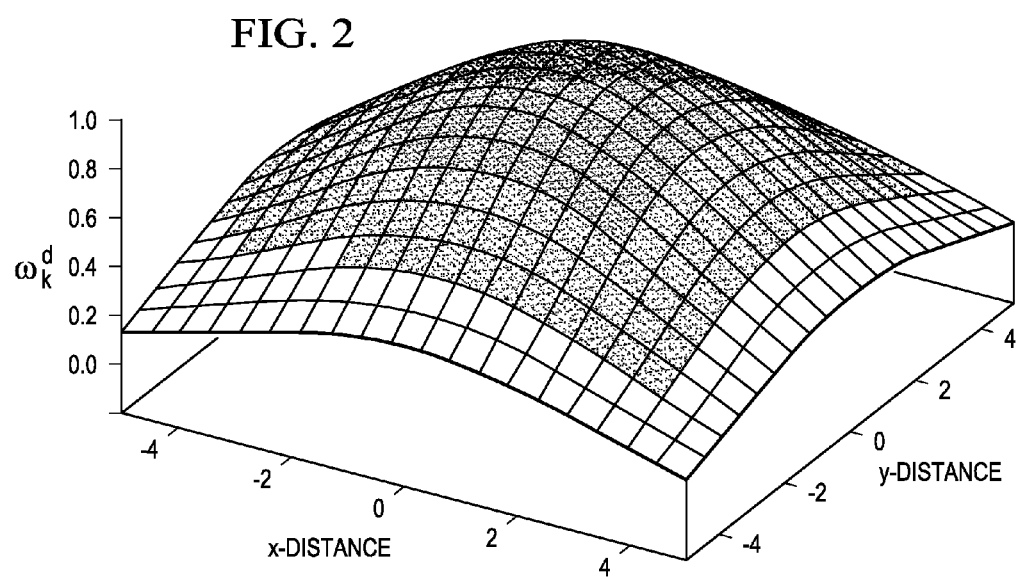
FIG. 2 shows a plot of the weighting function across pixels.

Thus pixels in the close proximity have higher impact on the outcome. Plot illustrating a sample $w_k^d$ is presented in FIG. 2.

Preserving luminance information is another important performance characteristic for the filters when suppressing noise. Thus in second filter defined here gray level similarity of a neighborhood pixel with mean luminance of the neighborhood is used to define weighting function. The filter thus defined is called Luminance-Similarity Adaptive Weighted-Local-Difference Median Filter. Once again considering the operational neighborhood illustrated in FIG. 1 we define the weighting function w for second filter as $$w_k = w_k^I(•) \times w_k^d(•) \quad (15)$$

where $w_k^d$ is previously defined and $w_k^I$ is a function of difference between $p_k$ and mean luminance $\bar{F}^{i,j}$ computed over the neighborhood W. The function $w_k^I$ is defined as $$w_k^I(•) = \frac{1}{1 + \left(\frac{(p_k - \bar{F}(i,j))/\bar{F}(i,j)}{\alpha}\right)^\gamma} \quad (16)$$

Figure 3:
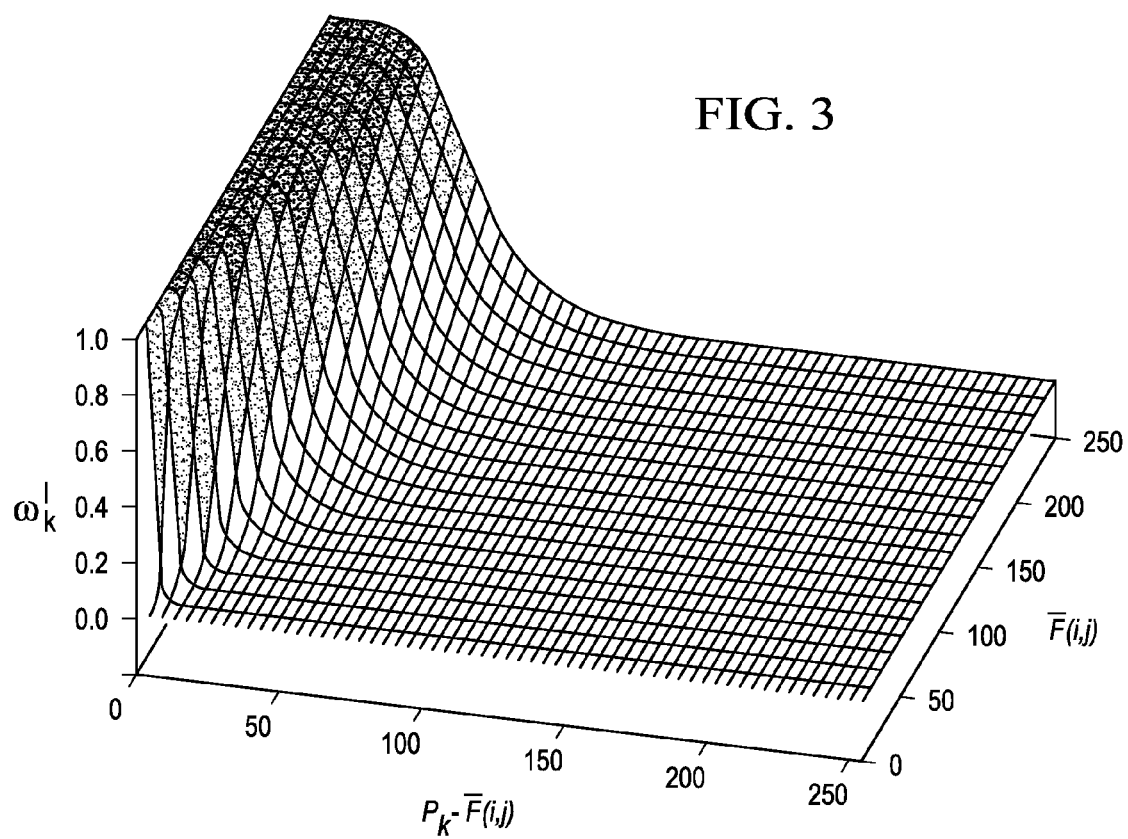
FIG. 3 show an adaptive weighting function.

Such definition of $w_k^I$ insures that the neighborhood pixel who have luminance less similar to the mean luminance of the neighborhood have small weights and may introduce only a small change in the input values. Plot illustrating a sample $w_k^I(•)$ is given in FIG. 3.

Following section presents the results for noise filtering by EOAWLDMF and LSAWLDMF along with two other nonlinear filters commonly used for noise suppression.

The noise suppression capability of the filters thus designed is evaluated with the help of a photographic image of a self portrait by Vincent van Gogh. The noise suppression capabilities are compared with MF and ADF. For experimentation the gray scale version of the image is corrupted with multiple noises to obtain two set of degraded images. First set of three images corrupted with speckle noise using model as given in Eq. 17

$$F^1 = F + nF \quad (17)$$

where F is the noise free image and n is the 0-mean Gaussian noise with variance $\sigma_s^2 = \{0.01, 0.02, 0.03\}$ over the set. The other set of three corrupted images each obtained by simultaneously corrupting noise free image with three types of noises in the following order 1) Quantum noise (signal dependent Poisson noise), 2) Thermal/Electronic noise (white, 0-mean Gaussian noise with variance $\sigma^2 = \{0.01, 0.02, 0.03\}$) and 3) Impulse noise (salt and pepper noise with density 0.01). Here the three images are corrupted with three different levels of Gaussian noise with similar levels of Quantum and Impulse noise.

In the experiments conducted to verify the noise suppression capability of the filters, both EOAWLDMF and LSAWLDMF consider a 5×5 neighborhood (W) for processing. The parameters in equation (14, 15) have values α=0.2, β=4 and γ=6. The filters are applied iteratively twice. Similarly the ADF is also applied iteratively twice and uses exponential diffusion function c defined in equation 11 and given as $$c_k = \exp\left\{-\left(\frac{p_k - F(i,j)}{K}\right)^2\right\} \quad (18)$$

where ck represents the value of the diffusion function at $k^{th}$ pixel location and K(=30) is the gradient modulus threshold that controls conduction. The integration constant δ is set at ⅐. The MF is not implemented iteratively. ADF and MF use a 3×3 neighborhood for processing.

Objective evaluation of noise suppression and image restoration capabilities of a filter can be done using full-reference quality assessment of the filtered images in comparison with the non-corrupted reference image (in our case original gray scale image). We use Structural Similarity Index (SSIM) and Gradient-based Structural Similarity Index (GSSIM) as measures of image restoration. SSIM is used to measure image distortion from the perspective of image formation and is sensitive to changes in structure incorporated due to processing. The value of SSIM varies in the range of −1 for worst match and 1 for best match (similar images). The GSSIM is used to evaluate how well the gradients in an image have been restored or preserved. The value of GSSIM also varies in the range of −1 for worst match and 1 for best match for gradient images of the reference and test image. From the resultant images and findings of the image restoration quality assessment for MF, ADF, EOAWLDMF and LSAWLDMF given in Table 1, it can be observed that LSAWLDMF and EOAWLDF both provide excellent image restoration in both the noise conditions tested here. They outperform both MF and ADF with comparative efficacy that increases with levels of noise. Results also show that with multiple noises present EOAWLDMF performs better than all other filters tested. Whereas LSAWLDMF has better efficacy in restoring speckle noise corrupted images.

TABLE 1

| Speckle Noise Level ($\sigma_s^2$) | SSIM | GSSIM | Image |
|---|---|---|---|
| 0.01 | 0.6756 | 0.7470 | Noisy Image |
|  | 0.6010 | 0.6705 | MF |
|  | 0.7349 | 0.7787 | ADF |
|  | 0.7315 | 0.7527 | EOAWLDMF |
|  | 0.7479 | 0.7831 | LSAWLDMF |
| 0.02 | 0.5710 | 0.6228 | Noisy Image |
|  | 0.5641 | 0.5722 | MF |
|  | 0.6145 | 0.6478 | ADF |
|  | 0.6664 | 0.6613 | EOAWLDMF |
|  | 0.6909 | 0.6900 | LSAWLDMF |
| 0.03 | 0.5118 | 0.5441 | Noisy Image |
|  | 0.5392 | 0.5076 | MF |
|  | 0.5443 | 0.5620 | ADF |
|  | 0.6247 | 0.6004 | EOAWLDMF |
|  | 0.6349 | 0.6076 | LSAWLDMF |

Triply Corruped Image*

| Gasissian Noise Level ($\sigma^2$) | SSIM | GSSIM | Images |
|---|---|---|---|
| 0.01 | 0.4978 | 0.5050 | Noisy Image |
|  | 0.5715 | 0.5664 | MF |
|  | 0.5350 | 0.5206 | ADF |
|  | 0.6328 | 0.5975 | EOAWLDMF |
|  | 0.6357 | 0.6000 | LSAWLDMF |
| 0.02 | 0.4113 | 0.3884 | Noisy Image |
|  | 0.5304 | 0.4573 | MF |
|  | 0.4344 | 0.3984 | ADF |
|  | 0.5412 | 0.4944 | EOAWLDMF |
|  | 0.5284 | 0.4610 | LSAWLDMF |
| 0.03 | 0.3662 | 0.3313 | Noisy Image |
|  | 0.5030 | 0.4022 | MF |
|  | 0.3827 | 0.3301 | ADF |
|  | 0.4961 | 0.4367 | EOAWLDMF |
|  | 0.4580 | 0.3834 | LSAWLDMF |

This invention describes a novel modification to order statistics filters to define a generic framework that enables quicker customization of the filter to suit specific requirements of an application. This modification, unlike many other modifications of the order statistics filters is able to generate an output that may not be a value from input signal values. Use of weighting function with values between range [0, 1] limits the output within the dynamic range of the input signal. By use of unity weighting function the modified order statistics filters converge to the conventional definitions of order statistics filters.

The generic framework defined here can be used to define more such filters for one dimensional as well as multidimensional signals.

Using the framework of AWLDOS we defined two filters that use weighting functions based on image details such as relative edge orientation in a neighborhood and local luminance similarity along with geometric relationship of the neighborhood pixels. Results of the image restoration quality assessment tests demonstrate that EOAWLDMF and LSAWLDF surpass both MF and ADF in noise suppression and image detail preservation for the tested noise conditions. Results also show that with multiple noises present EOAWLDMF performs best among the filters tested, whereas, LSAWLDMF has best efficacy in restoring speckle noise corrupted images. Further, by combining the weighting functions defined in section IV another custom filter that can be defined that adapts to the relative edge orientation of the edges in the neighborhood Luminance Similarity of pixels in the neighborhood and their spatial relationship.

What is claimed is:

1. A method of speckle noise suppression in images comprising the step of:

receiving an input image F(i,j), where F(i,j) is the grayscale value of the pixel at location (i,j);

introducing a weighting function into an Order Statistics Filter, the order statistics filter is represented by the following equations $$F_\ominus(i, j) = F(i, j) + \min_{p_k \in W} \{(p_k - F(i, j))\}$$

$$F_\oplus(i, j) = F(i, j) + \max_{p_k \in W} \{(p_k - F(i, j))\}$$

$$F_\odot(i, j) = F(i, j) + \text{med}_{p_k \in W} \{(p_k - F(i, j))\}$$

where the filter outputs $F_\ominus(i,j)$, $F_\oplus(i,j)$ and $F_\square(i,j)$ are defined in terms of sum of the central pixel gray value F(i,j) and corresponding order statistics $p_k$ over gray level differences of the neighborhood pixels W with the central pixel (i,j); and filtering the input image F(i,j) via an Order Statistics Filter as modified by the introduced weighting function.

2. The method of claim 1, further comprising:

introducing the weighting function w(•) into the order statistics filter as represented in the following equations $$F_\ominus(i, j) = F(i, j) + \min_{p_k \in W} \{w_k(p_k - F(i, j))\}$$

$$F_\oplus(i, j) = F(i, j) + \max_{p_k \in W} \{w_k(p_k - F(i, j))\}$$

$$F_\odot(i, j) = F(i, j) + \text{med}_{p_k \in W} \{(p_k - F(i, j))\}$$

where $w_k$ represents the value of weighting function w(•) for $k^{th}$ element in the W.

3. The method of claim 2, further comprising:

defining the weighting function as a direct/indirect function of the input signal and the spatial relations of the pixels thereby creating an adaptive filter operable to balance the level of filtering and preservation of the original signal.

4. The method of claim 2, further comprising:

defining the weighting function by the following equation $$w_k^d = \exp\left\{-\left(\frac{d_k}{\beta}\right)^2\right\}$$

where $dk = |dk^{-1}|$, and $\beta$ is a constant controlling the flatness of the $w^d_k(•)$ thus resulting in an edge orientation adaptive filter.

5. The method of claim 2, further comprising:

defining the weighting function by the following equation $$w_k = w_k^I(•) \times w_k^d(•)$$

where $w^I_k$ is a function of the difference between $p_k$ and mean luminance $F^{i,j}$ computed over the neighborhood W; and defining the function $w^I_k$ by the following equation $$w_k^I(•) = \frac{1}{1 + \left(\frac{(p_k - \overline{F}(i, j))/\overline{F}(i, j)}{\alpha}\right)^\gamma}$$

resulting in a luminance preserving adaptive filter.

* * * * *